(12) United States Patent
Harrison

(10) Patent No.: US 8,441,463 B2
(45) Date of Patent: *May 14, 2013

(54) HAND-HELD DEVICE WITH TOUCHSCREEN AND DIGITAL TACTILE PIXELS

(75) Inventor: Phil Harrison, London (GB)

(73) Assignee: Sony Computer Entertainment America LLC, Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/589,983

(22) Filed: Aug. 20, 2012

(65) Prior Publication Data

US 2012/0313879 A1 Dec. 13, 2012

Related U.S. Application Data

(63) Continuation of application No. 12/017,298, filed on Jan. 21, 2008, now Pat. No. 8,004,501, and a continuation of application No. 13/216,080, filed on Aug. 23, 2011, now Pat. No. 8,248,386.

(51) Int. Cl.
*G06F 3/045* (2006.01)
(52) U.S. Cl.
USPC ........................................ 345/174; 178/18.06
(58) Field of Classification Search .................. 345/169, 345/173–183; 178/18.01–18.09, 19.01–19.06, 178/20.01–20.04
See application file for complete search history.

(56) References Cited

U.S. PATENT DOCUMENTS

| | | | |
|---|---|---|---|
| 4,871,992 A | 10/1989 | Petersen | |
| 5,714,978 A | 2/1998 | Yamanka | |
| 6,445,284 B1 | 9/2002 | Cruz-Hernandez | |
| 7,342,573 B2 | 3/2008 | Ryynanen | |
| 8,004,501 B2 * | 8/2011 | Harrison | 345/174 |
| 8,248,386 B2 * | 8/2012 | Harrison | 345/174 |
| 2002/0033795 A1 | 3/2002 | Shahoian | |

(Continued)

FOREIGN PATENT DOCUMENTS

| | | |
|---|---|---|
| CN | 1286786 A | 3/2001 |
| DE | 102004005501 | 8/2005 |

(Continued)

OTHER PUBLICATIONS

Office Action issued for China Patent Application No. 200980103175.2 and dispatched Sep. 14, 2011.

(Continued)

*Primary Examiner* — Vijay Shankar
(74) *Attorney, Agent, or Firm* — Joshua D. Isenberg; JDI Patent

(57) ABSTRACT

A mobile electronic device has a touch screen display, a processor operably coupled to the touch screen display, and a network interface coupled to the processor. An array of one or more tactile pixels is located on the display or proximate the display along at least one edge of the touch screen display. Each of the tactile pixels in the array includes an actuatable portion coupled to an actuator. The actuatable portion is actuatable by the actuator in response to execution of one or more instructions by the processor. A tactile feel of the actuatable portion changes as a result of actuation of the actuatable portion by the actuator. This abstract is provided to comply with the rules requiring an abstract. It is submitted with the understanding that it will not be used to interpret or limit the scope or meaning of the claims.

20 Claims, 6 Drawing Sheets

U.S. PATENT DOCUMENTS

| | | | |
|---|---|---|---|
| 2003/0038776 | A1 | 2/2003 | Rosenberg |
| 2003/0184574 | A1 | 10/2003 | Phillips |
| 2004/0164968 | A1 | 8/2004 | Miyamoto |
| 2005/0057528 | A1 | 3/2005 | Kleen |
| 2006/0022952 | A1 | 2/2006 | Ryynanen |
| 2007/0152982 | A1 | 7/2007 | Kim et al. |

FOREIGN PATENT DOCUMENTS

| | | |
|---|---|---|
| EP | 1280319 | 1/2003 |
| JP | 6332601 | 12/1994 |
| JP | 10268756 | 10/1998 |
| JP | 2005-4058 | 1/2005 |
| JP | 200647538 | 2/2006 |
| KR | 20000044444 | 7/2000 |
| TW | 200729944 A | 8/2007 |
| WO | 9831005 | 7/1998 |
| WO | 2004051451 | 6/2004 |
| WO | 2005043371 | 5/2005 |

OTHER PUBLICATIONS

Weber G Ed—Ritter G X: "Reading and Pointing—Modes of Interaction for Blind Users" Information Processing, San Francisco, Aug. 28-Sep. 1, 1989; [Proceeding of the IFIP World Computer Congress], Amsterdam, North Holland, NL, vol. Congress 11, pp. 535-540, XP000079105.

U.S. Appl. No. 61/020,669 entitled "Gesture Cataloging and Recognition" filed by Thomas Miller IV on Jan. 11, 2008.

International Search Report for International Application No. PCT/US2009/031159 dated Jun. 16, 2009.

English Abstract of Korean Patent Publication No. 10-2000-0044444 entitled "Key Input Circuit of Cellular Telephone" published on Jul. 15, 2000 by Han, Jae Byeong.

Extended European Search Report for application EP09703968 dated May 30, 2011.

Taiwan IPO Search Report for Taiwan Invention Patent Application No. 09715124 completed Dec. 22, 2011.

Japan office action issued date Jan. 31, 2012 for Japan Patent Application No. 2010-543258.

Japan Non-Final Notification Reason for Refusal mailed dated May 29, 2012 for Japanese Patent Application No. 2012-080620.

Second Office Action issued May 24, 2012 for Chinese Patent Application No. 200980103175.2.

Iphone clinometer measures up . . . and down, and sideways, fried geek tomato, Jan. 2, 2009, URL, "http://www.friedgeektomato.com/2009/01/02/iphone-clinometer-measures-upand-down-and-sideways/".

Non-Final Office Action issued date Jan. 3, 2012 for U.S. Appl. No. 13/216,080, entitled "Hand-Held Device With Touchscreen and Digital Tactile Pixels".

Notice of Allowance and Fees Due issued date Apr. 18, 2012 for U.S. Appl. No. 13/216,080, entitled "Hand-Held Device With Touchscreen and Digital Tactile Pixels".

Third Office Action issued Sep. 25, 2012 for Chinese Patent Application No. 200980103175.2.

\* cited by examiner

US 8,441,463 B2

HAND-HELD DEVICE WITH TOUCHSCREEN AND DIGITAL TACTILE PIXELS

CLAIM OF PRIORITY

This application is a continuation of and claims the benefit of the filing date of U.S. patent application Ser. No. 12/017,298 (now U.S. Pat. No. 8,004,501) filed Jan. 21, 2008, the disclosure of which is hereby incorporated herein by reference.

This application is a continuation of U.S. patent application Ser. No. 13/216,080 (now U.S. Pat. No. 8,248,386) filed Aug. 23, 2011, the disclosure of which is hereby incorporated herein by reference, which claims the benefit of the filing date of U.S. patent application Ser. No. 12/017,298 (now U.S. Pat. No. 8,004,501) filed Jan. 21, 2008, the disclosure of which is hereby incorporated herein by reference.

FIELD OF THE INVENTION

Embodiments of the present invention are related to handheld devices and more particularly to hand-held devices that utilize touchscreens.

BACKGROUND OF THE INVENTION

Touchscreens are displays which also have the ability to detect the location of touches within the display area. This allows the display to be used as an input device, removing the keyboard and/or the mouse as the primary input device for interacting with the display's content. Such displays can be attached to computers or, as terminals, to networks. Touchscreens also have assisted in recent changes in the design of personal digital assistant (PDA), satellite navigation and mobile phone devices, making these devices more usable.

Touchscreens have become commonplace since the invention of the electronic touch interface in 1971 by Dr. Samuel C. Hurst. They have become familiar in retail settings, on point of sale systems, on automatic teller machines (ATMs) and on PDAs where a stylus is sometimes used to manipulate a graphical user interface (GUI) and to enter data. The popularity of smart phones, PDAs, portable game consoles and many types of information appliances is driving the demand for, and the acceptance of, touchscreens.

Existing touch screens are configured to receive a mechanical input and provide a visible output. However, existing touch screens are not configured to provide both a visible and a mechanical output.

It is within this context that embodiments of the present invention arise.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Figure 1A:
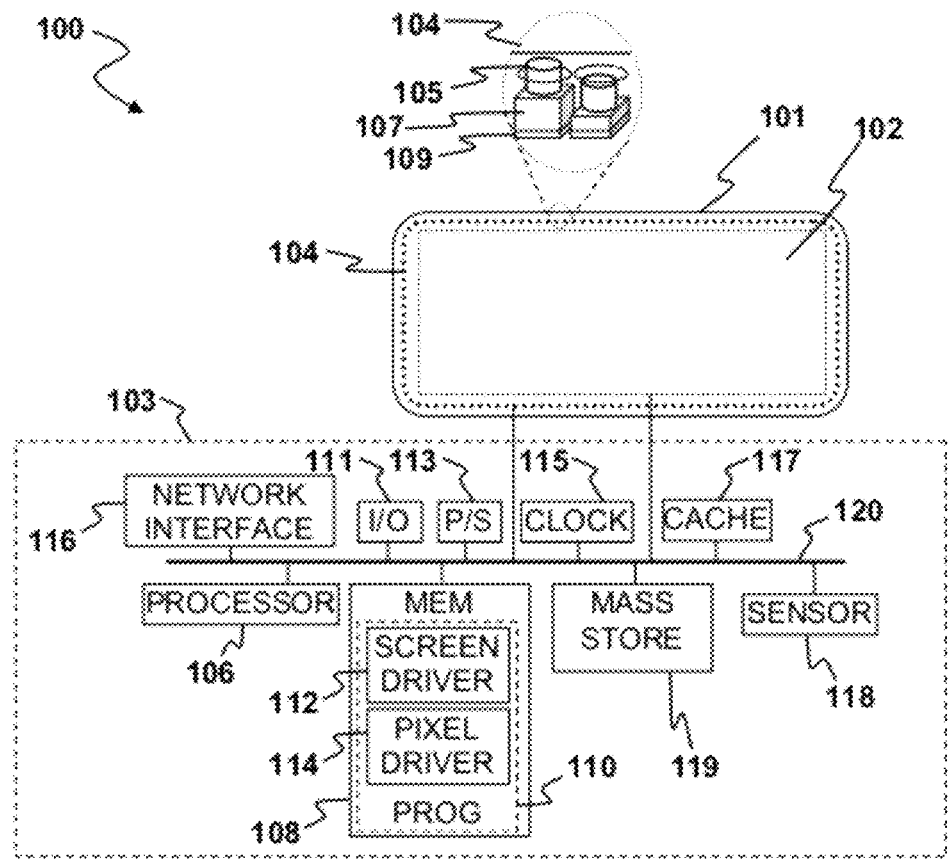
FIG. 1A is a block diagram of a hand-held device according to an embodiment of the present invention.

According to an embodiment of the invention, a shown in FIG. 1A, a handheld electronic device 100 includes a case 101 with a touch screen 102 formed on a major surface of the case 101. The case may be of sufficiently small size that it can be held in a user's hand. An array of one or more digital tactile pixels 104 may be located proximate an edge of the touch screen 102. The device may include a controller 103, the components of which may be located within the case 101. The controller 103 includes a processor 106 operably coupled to the touch screen 102. In some embodiments, the device 100 may include multiple processors 106 if parallel processing is to be implemented. The device 100 may be configured for use as a game device, a phone, a portable media player, an email device, web browser device and the like.

The touch screen 102 may be based on any suitable touch screen technology, such as resistive, surface-acoustic wave (SAW) capacitive, infrared, strain gauge, optical imaging, dispersive signal technology, acoustic pulse recognition, frustrated total internal reflection or graphics tablet based on magneto-strictive technology to locate the tip of a stylus. By way of example a resistive touch screen panel may be composed of several layers including two thin metallic electrically conductive and resistive layers separated by thin space. When some object touches this kind of touch panel, the layers are connected at certain point. The panel then electrically acts similar to two voltage dividers with connected outputs. This causes a change in the electrical current which is registered as a touch event which may be sent to the processor 106 for processing.

Surface Acoustic Wave technology uses ultrasonic waves that pass over the touch screen panel. When the panel is touched, a portion of the wave is absorbed. This change in the ultrasonic waves registers the position of the touch event and sends this information to the controller for processing.

A capacitive touch screen panel may be coated with a material, e.g., indium tin oxide that conducts a continuous electrical current across the sensor. The sensor therefore exhibits a precisely controlled field of stored electrons in both the horizontal and vertical axes. When the capacitive touch screen's 'normal' capacitance field (its reference state) is altered by an externally applied electric field, e.g., from a user's finger, electronic circuits located at each corner of the panel measure a resultant 'distortion' in the characteristics of the reference field and send the information about the event to the processor 106 for mathematical processing.

An infrared touch screen panel may employ one of two different methodologies. One method uses thermal induced changes of the surface resistance. Another method is an array of vertical and horizontal IR sensors that detected interruption of a modulated light beam near the surface of the screen.

In a strain gauge configuration the screen is spring mounted on the four corners and strain gauges are used to determine deflection when the screen is touched. This technology may also measure movement of the screen 102 along the Z-axis.

In touch screen technology based on optical imaging, two or more image sensors may be placed around the edges (mostly the corners) of the screen. Infrared backlights may be placed in a camera's field of view on the other sides of the screen. A touch shows up as a shadow and each pair of cameras can then be triangulated to locate the touch.

Dispersive signal technology may use sensors to detect mechanical energy in the glass that occurs due to a touch. Complex algorithms then interpret this information and provide the actual location of the touch.

Touch screens based on acoustic pulse recognition may use more than two piezoelectric transducers located at some positions of the screen to turn the mechanical energy of a touch (vibration) into an electronic signal. This signal may then be converted into an audio file, and then compared to preexisting audio profile for every position on the screen.

Touch screens based on frustrated total internal reflection use the principle of total internal reflection to fill a refractive medium with light. When a finger or other soft object is pressed against the surface, the internal reflection light path is interrupted, making the light reflect outside of the medium and thus visible to a camera behind the medium.

Referring again to FIG. 1A, each of the tactile pixels 104 includes an actuatable portion 105 coupled to an actuator 107 and a sensor 109. The actuator 107 and sensor 109 are coupled to the processor 106. The actuator 107 is configured to actuate in response to instructions from the processor 106 and the sensor 109 is configured to generate signals as inputs to one or more programs executed by the processor 106 when pressure is applied to the actuatable portion 105. The actuator 107 may be any suitable electromechanical actuator. Examples of suitable actuators include piezoelectric actuators, MEMS actuators and magnetic coil actuators. The sensor 109 may be any suitable sensor, e.g., capacitive gauge sensor, piezoelectric sensor, resistive sensor, strain gauge and the like. In some cases, such as the particular case of piezoelectric devices, the same device may be used as both the actuator 107 and the sensor 109.

The actuatable portion 105 is actuatable by the actuator 107 between first and second positions. A tactile feel of the actuatable portion 105 is different in the first and second positions. For example, as shown in the inset to FIG. 1A, the actuatable portion 105 may be flush with or recessed below a surface of the case 101 in the first position and raised up above the surface in the second position. By way of example, the actuatable portion 105 may change from flush to protruding or vice versa or from flush to recessed or vice versa. Preferably, the actuatable portion is sufficiently wide and protrudes by a sufficient amount that it can be sensed by a users fingers. It may also be desirable for adjacent tactile pixels to be spaced sufficiently far apart that they may be distinguished. By way of example a protrusion of about 0.5 millimeters and an inter-dot spacing of about 2.5 millimeters is sufficient for sensing and distinguishing the raised dots that make up Braille cells.

Figure 1B:
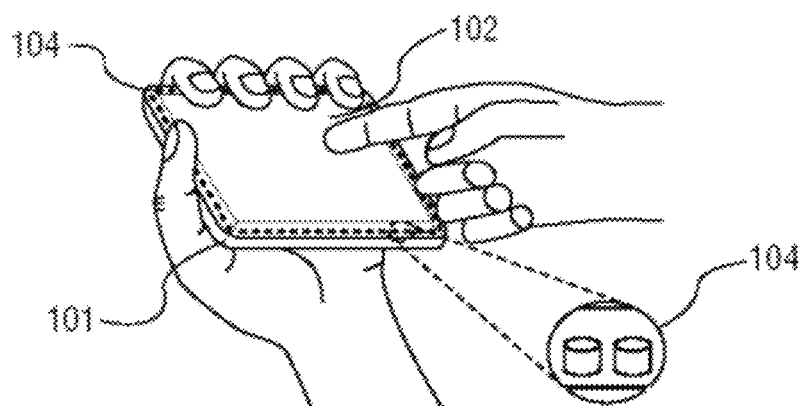
FIG. 1B is a three-dimensional diagram of a hand-held device according to an embodiment of the present invention.
Figure 1C:
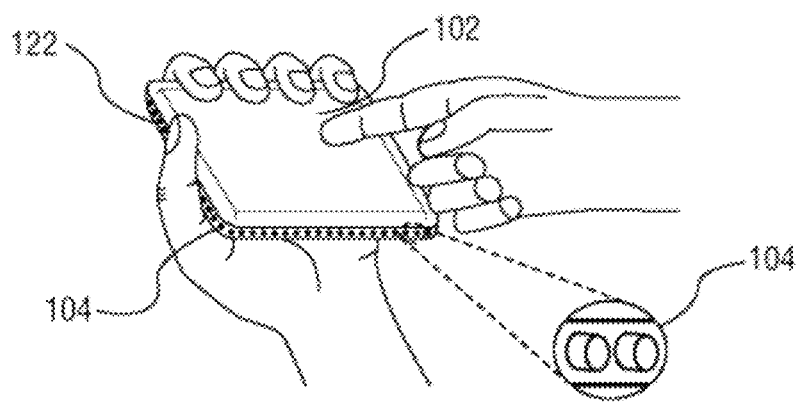
FIG. 1C is a three-dimensional diagram of a hand-held device according to another alternative embodiment of the present invention.
Figure 1D:
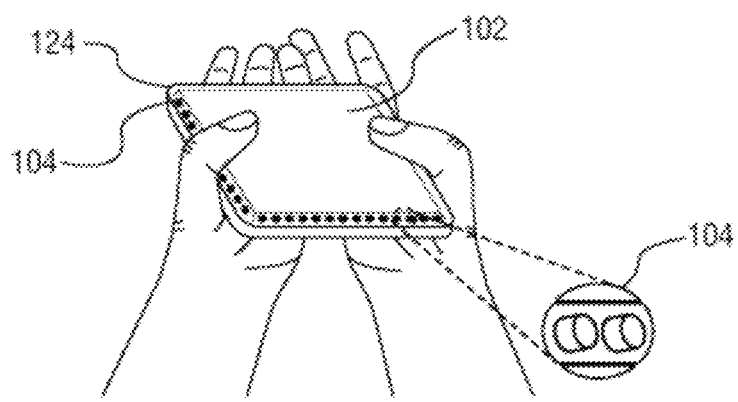
FIG. 1D is a three-dimensional diagram of a hand-held device according to another alternative embodiment of the present invention.

There are a number of different possible configurations for the digital tactile pixels 104. By way of example, and without loss of generality, the one or more digital tactile pixels may be located along perimeter of touch screen 102 on the same face of the device as the touch screen 102 as shown in FIG. 1B. In this example, a user may hold the device 100 in the right hand and work the touch screen 102 with the index finger of the left hand. The tactile pixels 104 may be sensed by the fingers of the left hand. In an alternative embodiment, shown in FIG. 1C, the tactile pixels 104 may be located along a side edge 122 of the device 100. In another alternative embodiment, the one or more digital tactile pixels 104 may be located on a beveled edge 124 of the handheld device as shown in FIG. 1D.

Figure 1E:
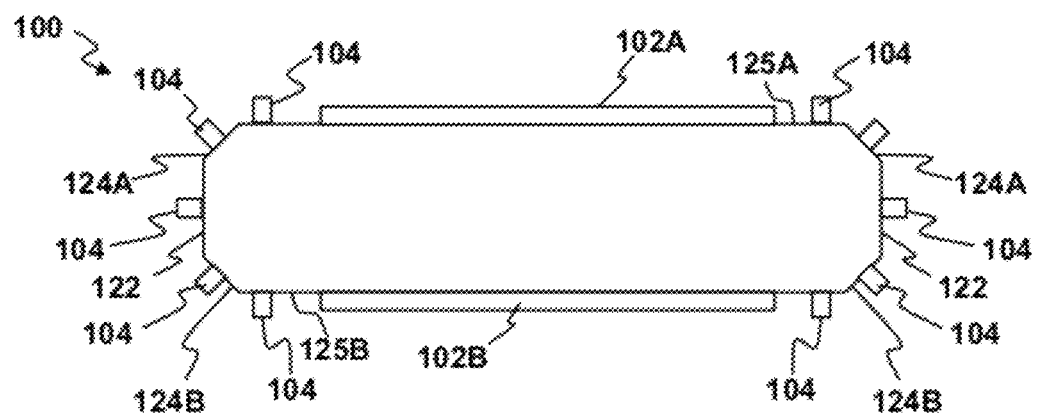
FIG. 1E is a side elevation diagram of a hand-held device according to another alternative embodiment of the present invention.

Furthermore, it is noted that in certain embodiments of the invention the device 100 may include two touch screens located on opposite faces of the case 101 and tactile pixels 104 located on one or more major surfaces as well as a side edge and one or more bevels. For example, as shown in FIG. 1E, the hand-held device 100 may have a first touch screen 102A disposed on a first major surface 125A and a second touch screen 102B disposed on a second major surface 125B. Tactile pixels 104 may be disposed on the first major surface 125A proximate an edge of the first touch screen 102A or on the second major surface 125B proximate an edge of the second touch screen 102B. In addition, tactile pixels 104 may be disposed on a side edge 122 between the first and second major surfaces. Furthermore tactile pixels 104 may be disposed on a first beveled edge 124A between the first major surface 125A and the side edge 122 and/or on a second beveled edge 124B between the side edge 122 and the second major surface 125B.

The hand-held device 100 may further include a memory 108 (e.g., RAM, DRAM, ROM, and the like). The memory 108 may store program instructions 110 for execution on the processor 106. The program instructions 110 may be configured to respond to inputs from one or more input sources on the device (e.g., the touch screen 102 or tactile pixels 104) or remote input sources that are coupled to the device. The program instructions 110 may include touch-screen driver instructions 112 configured to respond to inputs from and generate images displayed on the touch screen 102. The instructions 110 may further include another tactile pixel driver instructions 114. These later instructions may be configured to selectively actuate one or more of the tactile pixels 104 and/or receive input from one or more of the tactile pixels 104 when execution of the program instructions reaches a predetermined state. The tactile pixels 104 are located in proximity to the touch screen 102 in such a way that the tactile feel of the device may dynamically change in response to program commands or the state of what is occurring on the touch screen 102.

The hand-held device 100 may also include well-known support functions, such as input/output (I/O) elements 111, power supplies (P/S) 113, a clock (CLK) 115 and cache 117. The device 100 may optionally include a mass storage device 119 such as a disk drive, CD-ROM drive, flash drive, or the like to store programs and/or data. The touch screen 102, tactile pixels 104, processor 106, memory 108 and other components of the device 100 may exchange signals (e.g., code instructions and data) with each other via a system bus 120 as shown in FIG. 1A. In some embodiments, the device 100 may include a network interface 116, configured to allow the device to exchange signals with other devices over a network. Furthermore, the hand-held device 100 may include one or more sensors 118. Such sensors may include, e.g., an inertial sensor such as an accelerometer or tilt sensor, an optical sensor, an acoustic sensor such as a microphone or microphone array. The sensors may generate inputs to the program instructions 110 that reflect the environment in which the hand-held device operates.

In embodiments of the invention the tactile pixel driver instructions 114 may be configured to control whether a given tactile pixel is in the first position or the second position, e.g., whether pixel is up or down, based on state of the touch screen 102. The state of the tactile pixels may thereby be made to respond to what is being represented by images displayed on the touch screen (e.g., game events, in the case of a hand-held game device). By way of example, an array of tactile pixels 104 that surrounds the touch screen 102 could produce the tactile equivalent of a digital chaser light display effect in response to game events, by selectively changing particular tactile pixels from the "up" to down in sequence.

Figure 2:
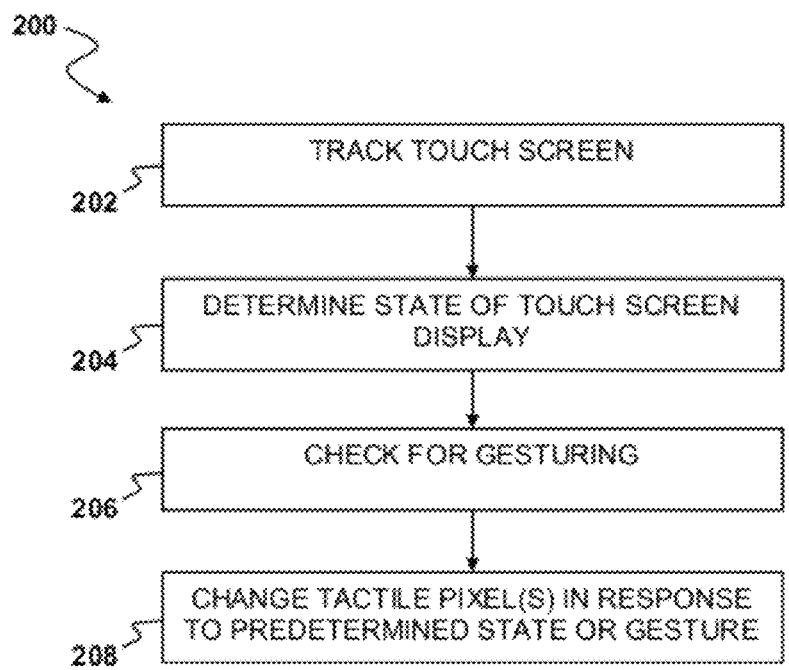
FIG. 2 is a flow diagram of illustrating operation of a hand-held device of the type shown in FIGS. 1A-1E.

In addition, according to certain embodiments of the invention, the tactile pixel driver instructions 114 may dynamically configure which functions will be performed when particular tactile pixels or groups of tactile pixels are pressed. By way of example, FIG. 2 illustrates a method 200 for operating a hand-held device of the types shown in FIG. 1A through FIG. 1D. As indicated at 202 user input may be tracked with the touch screen 102. The touch screen may track entries made by a user's finger or a stylus in close proximity to or pressing against the touch screen. At 204 a state of the touch screen is determined. The state of the touch screen is generally a reflection of images that are displayed on the touch screen and inputs received with the touch screen. As an example, the device 100 may be configured as a video game device. In such a case, the state of the touch screen 102 may reflect a state of the game or events occurring within the context of a game. The state may be determined by comparing the image displayed on the touch screen and inputs received from the touch screen to a corresponding list of know images and inputs corresponding to known states.

In other embodiments the change of state may be triggered by a change of state of some other device that is in communication with the hand-held device. For example, if the device 100 is configured to operate as a mobile phone, e.g., a cell phone, the tactile pixels 104 may change state when a call to or from another remote device begins or ends.

By way of example, as indicated at 206, the inputs may optionally be compared to known inputs made with the touch screen that correspond to predetermined gestures. For example, drawing an "X" with the finger on the touch screen may correspond to some particular command within the context of execution of the program instructions 110. Gesture recognition may be implemented in any of a number of ways. Examples of gesture recognition are described, e.g., in commonly assigned U.S. Provisional Patent Application 61/020,669 to Thomas Miller IV, entitled GESTURE CATALOGING AND RECOGNITION, filed Jan. 11, 2008, which is incorporated herein by reference.

As indicated at 208 a state of one or more of the tactile pixels 104 may be changed in response to detection of a predetermined state of the display. By way of example, certain selected tactile pixels may be set in the "up" state and others may be set in the "down" state if a particular predetermined state is detected. In certain embodiments, selected tactile pixels may be activated to act as input buttons for execution of portions of the program instructions 110.

Figure 3:
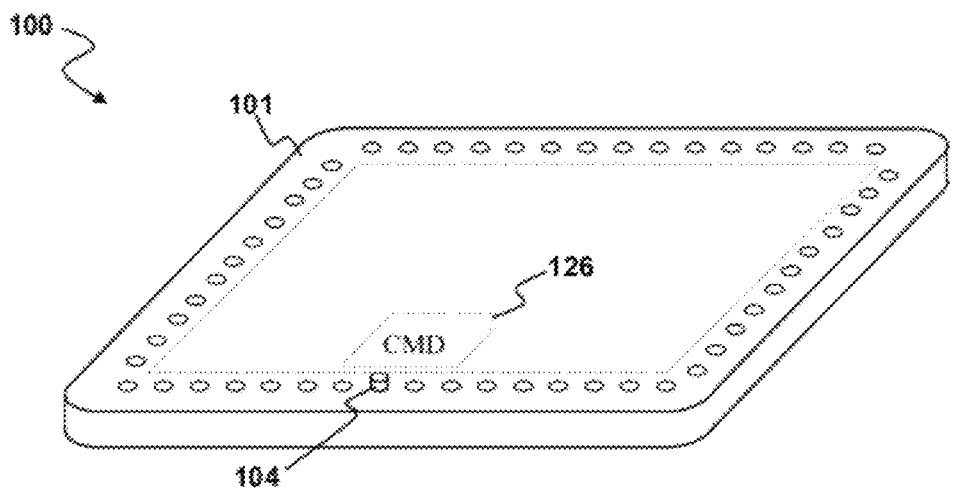
FIG. 3 is a three-dimensional diagram illustrating use of a portion of the tactile array as a command button in a hand-held device according to an embodiment of the present invention.

By way of example, as depicted in FIG. 3, when the state of the touch screen 102 is such that a command region 126 is displayed one or more particular tactile pixels 104 proximate the command region 126 may be activated. In the activated state, the particular tactile pixels 104 proximate the command region 126 may be in an "up" position, where they can easily felt by a user and where they can act as buttons. The particular tactile pixel may be mapped to an input for a particular command corresponding to the command displayed in the command region. When this state is detected, the state of the tactile pixels 104 may change by selectively actuating one or more particular tactile pixels 104 proximate the command region 126 shown on the touch screen such that the one or more particular tactile pixels 104 can be felt by a user and configuring the particular pixels to act as a button to execute the command with the hand-held device 100. In some embodiments the tactile pixel driver instructions 114 may be configured to vibrate one or more particular tactile pixels to draw the user's attention to them. Vibration of the tactile pixels could be used guide the fingers toward command region 126. The tactile pixels could be configured to vibrate in response to images displayed on or inputs received from the touch screen 102. For example, certain tactile pixels may vibrate with greater amplitude when scrolling is close to an end point. Alternatively, the frequency of tactile pixel vibration may be tied to a state of a gesture made with the finger on the touch pad 102.

Figure 4:
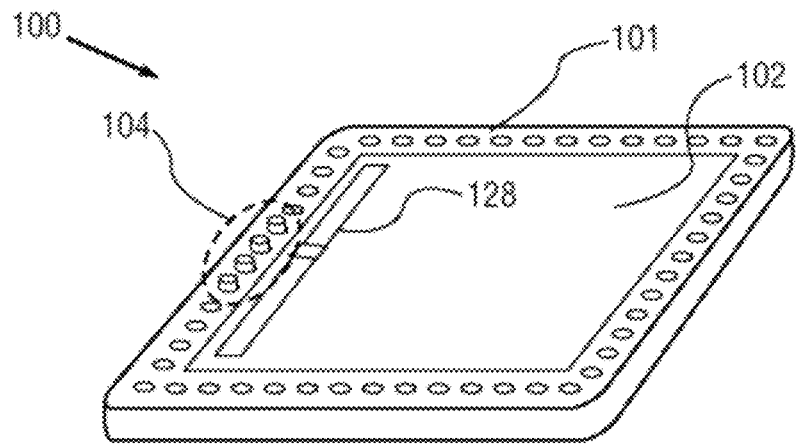
FIG. 4 is a three-dimensional diagram illustrating use of a portion of a tactile array as a scroll wheel in a hand-held device according to an embodiment of the present invention.

For some touch screens it is sometimes hard to tell where the edge of screen is located. In certain embodiments of the invention, the tactile pixels 104 may be used as a guide to the location of the edge of the screen. For example, as shown in FIG. 4, changing the state of the tactile pixels 104 may include selectively actuating one or more particular pixels 104 such that they can be felt by a user and configuring the particular pixels 104 to act as a scroll wheel for the hand-held device 100. The predetermined state may be one in which a scroll bar 128 is displayed on the touch screen 102. Selected tactile pixels 104 proximate the scroll bare 128 may be in a raised state for use as scroll wheel. The user may operate the selected tactile pixels 104, e.g., by stroking them in sequence with the thumb or index finger. The tactile pixel driver 114 may be configured to associate pressing the selected tactile pixels 104 in a particular sequence as scrolling instruction. A particular image displayed with the touch screen may be scrolled as a result.

Figure 5:
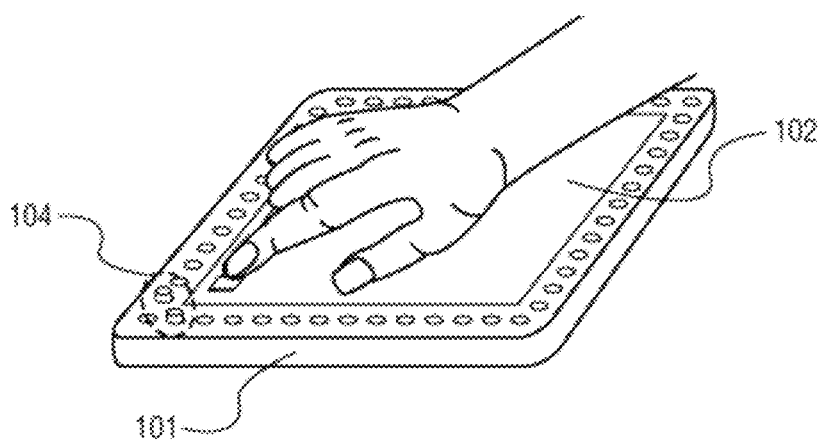
FIG. 5 is a three dimensional diagram illustrating use of a portion of a tactile array to indicate an end of a scrolling in a hand-held device according to an embodiment of the present invention.

In yet another example, as shown in FIG. 5, changing the state of the tactile pixels 104 may include using selected tactile pixels 104 to mark and endpoint for scrolling. Particular tactile pixels 104 at the corner of the touch screen 102 may be actuated to the "up" state when the endpoint of scrolling is reached. The raised tactile pixels 104 may provide a tactile cue to the user that the end of scrolling has been reached.

Figure 6A:
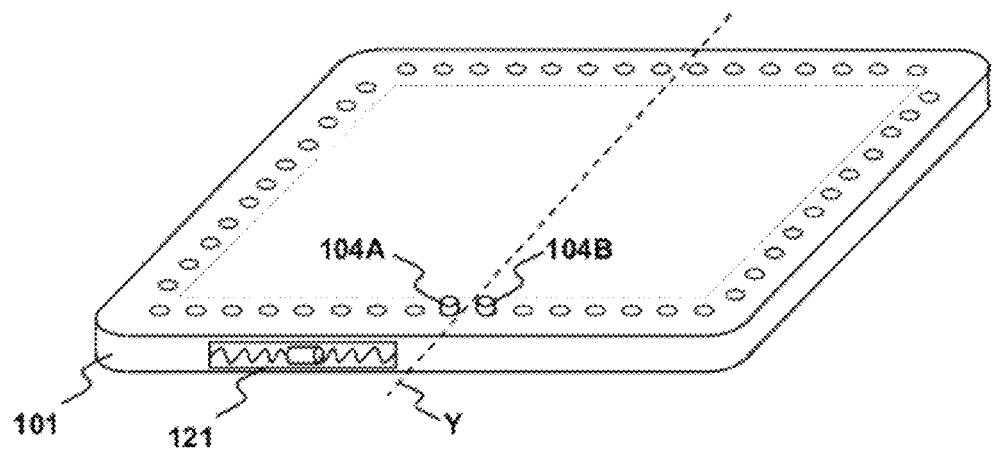
FIGS. 6A-6B are three dimensional diagrams illustrating use of a portion of a tactile array as a level indicator in a hand-held device according to an embodiment of the present invention.
Figure 6B:
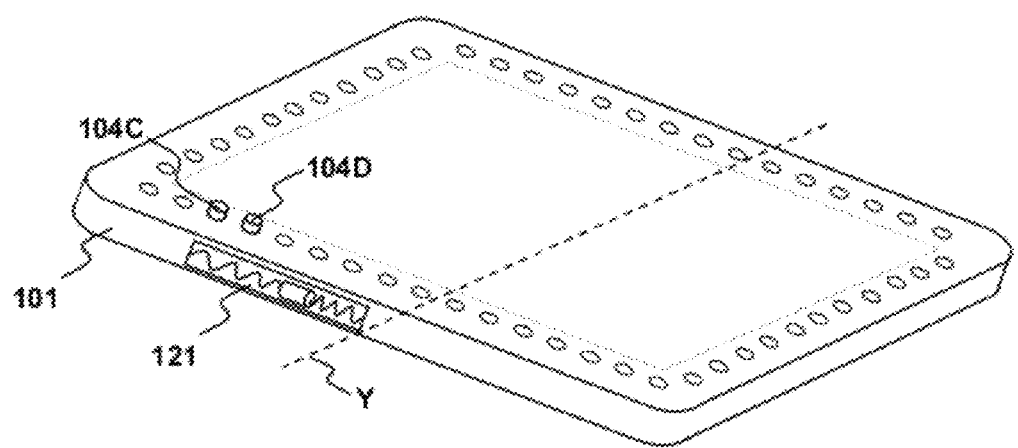

In some embodiments, the change of state of the tactile pixels 104 may be triggered by a change of state of one or more of the sensors 118. By way of example, the configuration of the tactile pixels 104 may respond to a tilt sensor. For instance, as shown in FIGS. 6A-6B, the device 100 may include a tilt sensor 121 mounted within the case 101. The tilt sensor 116 may be coupled to the processor 106. The tilt sensor 121 may produce a signal input that depends on the relative orientation of the case 101 and this signal may be used to change the state of the tactile pixels 104. For example, as shown in FIG. 6A, when the tilt sensor 121 senses that the case is held level, a particular subset of the tactile pixels 104 may be raised. In this case, two tactile pixels 104A, 104B closest to an axis of rotation Y may be raised. When the case 101 is tilted the tilt sensor 121 may produce a signal proportional to the magnitude of the tilt and sensitive to the direction of tilt. The tactile pixel driver 114 may be configured to cause the tactile pixels 104A, 104B closest to the axis Y to be lowered and one or more tactile pixels 104C, 104D further away from the axis to be raised, as shown in FIG. 6B. The effect of a bubble level may be simulated by selectively raising and lowering tactile pixels in response to signals from the tilt sensor 121 as shown in FIGS. 6A-6B.

Figure 7:
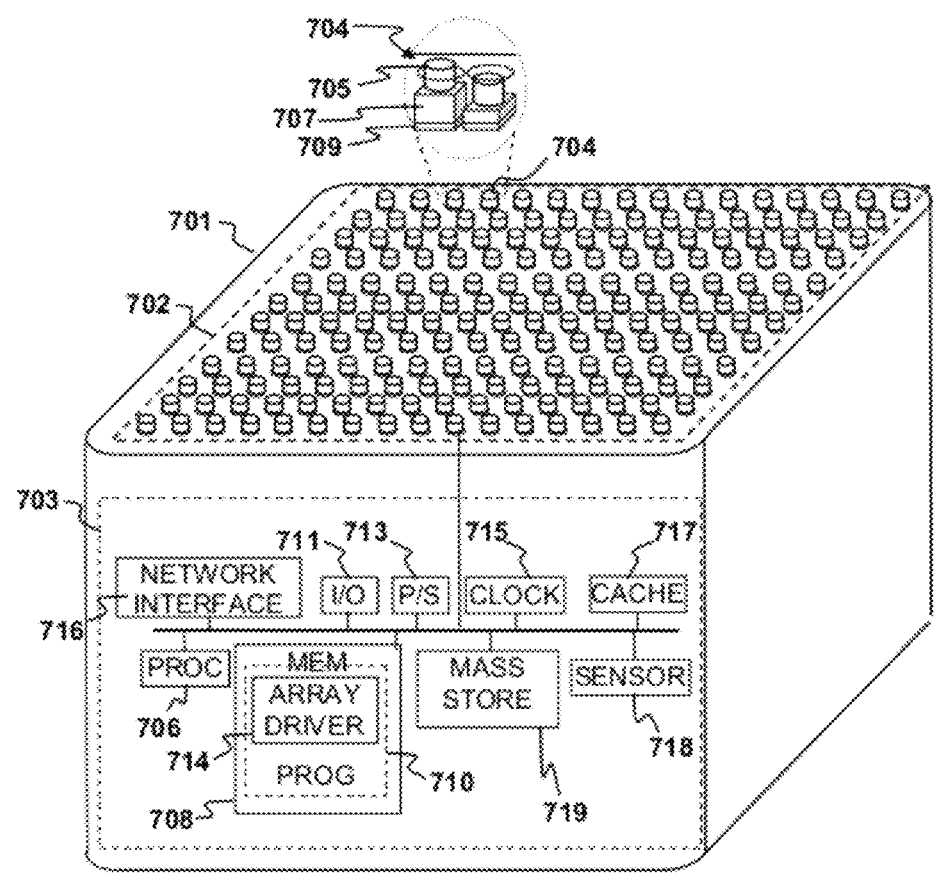
FIG. 7 is a three-dimensional diagram of an electronic device according to an alternative embodiment of the invention.

In some embodiments of the present invention an array of electro-mechanical tactile pixels of the type described above may be used as the equivalent to touch screen. For example, as shown in FIG. 7, a device 700 may include a case 701 and a touch screen 702 formed from an array of tactile pixels 704 may be disposed on a major surface of the case 701. The tactile pixels 704 may be implemented as described above with respect to tactile pixels 104, e.g., with piezoelectric actuator/sensors. A processor 706 may be operably coupled to the touch screen. The device 700 may be configured to operate as a game device, a phone, a portable media player, an email device, web browser device and the like.

Each of the tactile pixels 704 in the array includes an actuatable portion 705 coupled to an actuator 707 and a sensor 709. The actuator and sensor are coupled to the processor 706. The actuator 707 is configured to actuate in response to instructions from the processor 706. The sensor 709 is configured to generate signals when pressure is applied to the actuatable portion 705. The signals may act as inputs to as inputs to one or more programs 710 stored in a memory 708 and executed by the processor 706. The programs 710 may include a specially configured tactile pixel array driver 714. The actuatable portion 705 is actuatable by the actuator 707 between first and second positions in response to execution of one or more instructions by the processor 706. A tactile feel of the actuatable portion 705 is different in the first and second positions.

The device 700 may also include well-known support functions, such as input/output (I/O) elements 711, power supplies (P/S) 713, a clock (CLK) 715 and cache 717. The device 700 may optionally include a mass storage device 719 such as a disk drive, CD-ROM drive, flash drive, or the like to store programs and/or data. The tactile pixels 704, processor 706, memory 708 and other components of the device 100 may exchange signals (e.g., code instructions and data) with each other via a system bus 120 as shown in FIG. 1A. In some embodiments, the device 700 may include a network interface 716, configured to allow the device to exchange signals with other devices over a network. Furthermore, the hand-held device 700 may include one or more sensors 718. Such sensors may include, e.g., an inertial sensor such as an accelerometer or tilt sensor, an optical sensor, an acoustic sensor such as a microphone or microphone array. The sensors may generate inputs to the program instructions 710 that reflect the environment in which the hand-held device operates.

All of the features described above with respect to the hand-held device 100 may also be applied to the device 700.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A mobile electronic device, comprising:
a touch screen display;
a processor operably coupled to the touch screen display;
a network interface coupled to the processor; and
an array of one or more tactile pixels located on the display or proximate the display along at least one edge of the touch screen display, wherein each of the tactile pixels in the array includes an actuatable portion coupled to an actuator, wherein the actuatable portion is actuatable by the actuator in response to execution of one or more instructions by the processor, wherein a tactile feel of the actuatable portion changes as a result of actuation of the actuatable portion by the actuator.

2. The device of claim 1 wherein the device is configured to be used as a game device.

3. The device of claim 1 wherein the device is configured to be used as a phone.

4. The device of claim 1 wherein the device is configured to be used as a mobile phone.

5. The device of claim 1 wherein the device is configured to be used as a cell phone.

6. The device of claim 1 wherein the device is configured to be used as a portable media player.

7. The device of claim 1 wherein the device is configured to be used as an email device.

8. The device of claim 1 wherein the device is configured to be used as a web browser device.

9. The device of claim 1 wherein the device is configured such that the one or more of the tactile pixels provide tactile feedback to a user in response to an input entered with the touch screen display.

10. The device of claim 1, wherein the processor is configured to track a user input to the touch screen, determine a state of the touch screen, and change a state of the one or more tactile pixels in response to detection of a predetermined state of the display.

11. The device of claim 10 wherein the user input to the touch screen corresponds to user input to a video game.

12. The device of claim 1 wherein the hand-held device includes a tilt sensor and the predetermined state corresponds to a change in state of the tilt sensor.

13. The device of claim 1 wherein the tactile pixels are configured to change state by selective actuation of one or more particular pixels such that they can be felt by a user and configuring the particular pixels to act as a scroll wheel for the hand-held device.

14. The device of claim 1 wherein the tactile pixels are configured to change state by selective actuation of one or more particular tactile pixels proximate a command shown on the touch screen such that the one or more particular pixels can be felt by a user and configuring the particular pixels to act as a button to execute the command with the hand-held device.

15. The device of claim 1, wherein the one or more particular tactile pixels are configured to vibrate.

16. The device of claim 1 wherein the device is configured such that one or more of the tactile pixels provide tactile feedback to a user in response to a predetermined state of the touch screen display.

17. The device of claim 1 wherein the device is configured such that a particular one or more of the one or more of the tactile pixels are positioned to act as buttons associated with specific command inputs to the device.

18. The device of claim 1 wherein the device is configured to be used as a game device and wherein the devices is configured to change a state of the one or more tactile pixels in response to a change in a game state or game event.

19. The device of claim 1, wherein the device is configured such that a state of the one or more tactile pixels changes in response to a change in state of one or more other devices in communication with the hand-held electronic device.

20. The device of claim 1, wherein the touch screen display includes one or more sensors include one or more resistive, surface-acoustic wave (SAW) capacitive, infrared, strain gauge, optical imaging, dispersive signal, acoustic pulse recognition, frustrated total internal reflection or magneto-strictive sensors.

\* \* \* \* \*